(12) United States Patent
Hara et al.

(10) Patent No.: US 7,190,401 B2
(45) Date of Patent: Mar. 13, 2007

(54) IMAGE PROCESSING APPARATUS AND IMAGE PROCESSING METHOD

(75) Inventors: Manabu Hara, Kanagawa (JP);
Yoshihiro Morioka, Kanagawa (JP);
Norihiko Kawada, Kanagawa (JP);
Susumu Kurita, Kanagawa (JP)

(73) Assignee: Sony Corporation, Tokyo (JP)

( * ) Notice: Subject to any disclaimer, the term of this patent is extended or adjusted under 35 U.S.C. 154(b) by 727 days.

(21) Appl. No.: 10/329,604

(22) Filed: Dec. 26, 2002

(65) Prior Publication Data
US 2003/0122951 A1    Jul. 3, 2003

(30) Foreign Application Priority Data
Dec. 27, 2001   (JP)   ............................ P2001-397470

(51) Int. Cl.
*H04N 5/222* (2006.01)
*H04N 5/262* (2006.01)
(52) U.S. Cl. ............. 348/333.02; 348/239; 348/333.12
(58) Field of Classification Search ................ 358/520; 345/634; 348/333.12, 222.1, 234, 576, 673, 348/678, 237, 333.02, 239
See application file for complete search history.

(56) References Cited

U.S. PATENT DOCUMENTS

| | | | | |
|---|---|---|---|---|
| 4,991,007 A | * | 2/1991 | Corley | ........................ 348/188 |
| 5,012,333 A | * | 4/1991 | Lee et al. | ..................... 358/520 |
| 5,021,333 A | * | 6/1991 | Leyshon et al. | ............. 430/551 |
| 5,459,521 A | * | 10/1995 | Usami | ......................... 348/445 |
| 5,493,418 A | * | 2/1996 | Takahashi et al. | ........... 358/451 |
| 5,930,009 A | * | 7/1999 | Sato et al. | .................... 358/518 |

FOREIGN PATENT DOCUMENTS

| | | |
|---|---|---|
| EP | 0 725 536 | 8/1996 |
| EP | 0 844 788 | 5/1998 |
| EP | 0 999 705 | 5/2000 |
| JP | 8 294138 | 5/1996 |

* cited by examiner

*Primary Examiner*—Ngoc-Yen Vu
*Assistant Examiner*—Gregory Madden
(74) *Attorney, Agent, or Firm*—Frommer Lawrence & Haug LLP; William S. Frommer; Thomas F. Presson (57) ABSTRACT

An image processing apparatus and an image processing method permit easy adjustment of luminance and contrast, and also permit easy check of the brightness of a target image. A signal format of an image signal is determined by a determiner circuit, and an image signal of a luminance reference image that provides the standard for determining luminance is generated by a luminance reference signal generator circuit on the basis of a result of the determination. A mixing circuit generates an image signal for displaying a target image combined with a luminance reference image. The signal level of the image signal is adjusted by an adjusting circuit so as to adjust luminance and/or contrast. A discrimination display signal superimposing circuit generates a signal of a luminance identifying image superimposed in a desired luminance area. From the luminance reference image, the brightness at a desired position on an image can be easily checked.

21 Claims, 7 Drawing Sheets

LUMINANCE REFERENCE IMAGE — TARGET IMAGE — LUMINANCE REFERENCE IMAGE

FIG. 7

LUMINANCE REFERENCE IMAGE

TARGET IMAGE

LUMINANCE REFERENCE IMAGE

FIG. 8

LUMINANCE
REFERENCE IMAGE

FIG. 9

LUMINANCE DISCRIMINATION
IMAGE SUPERIMPOSED PORTION

LUMINANCE
DISCRIMINATION
IMAGE
SUPERIMPOSED
PORTION

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of the Related Art

In the production of television programs or the like, the imaging, editing, sending, and the like for programs have been increasingly digitized. With the trend toward higher image quality and lower prices of digital equipment due to the advancing digitization technology, the digitization is accelerating also in the field of film making or the like. For instance, video cameras for obtaining the image signals of target images are replacing the film cameras for recording photographed images on films.

When using a film camera, the amount of received light of an object is measured by an illuminometer to adjust exposure. This is necessary to accomplish effective presentment, and also because the luminance level of the image on a viewfinder of the film camera is different from the luminance level of the image recorded on a film. When a video camera is used, the dynamic range of the video camera is narrower than that of a film camera, and a difference in the amount of received light of an object exerts considerable influences. For these reasons, efforts are made to accurately control the amount of received light of an object by using an illuminometer.

In a video camera, a target image is displayed on the screen of an electronic viewfinder formed of a cathode ray tube or the like. The electronic viewfinder allows the luminance and contrast of a displayed image to be adjusted. For each imaging or for each video camera, adjustment is performed using, for example, a waveform monitor, to obtain constant luminance and/or contrast of display images.

Therefore, if imaging is carried out for an extended period of time or many video cameras are used for imaging, then more time and efforts and more equipment for making adjustment are required.

Furthermore, in the case of outdoor shooting, the amount of received light of an object changes with a change in weather or with the elapse of time. In order to obtain desired images, therefore, the amounts of received light must be frequently measured at multiple points to perform primarily the adjustment of the iris of a video camera on the basis of measurement results, thus interfering with efficient shooting.

SUMMARY OF THE INVENTION

Accordingly, it is an object of the present invention to provide an image processing apparatus and an image processing method that permit easy adjustment of the luminance and contrast of an image display apparatus and to permit easy check of the brightness of a target image.

To this end, one aspect of the present invention provides an image processing apparatus including a signal generator for generating an image signal of a luminance reference image that provides a standard for determining a luminance, and a mixer that uses an input image signal and an image signal of the luminance reference image to generate an image signal for displaying a combination of a display image based on the input image signal and the luminance reference image.

In a preferred form of the invention, the image processing apparatus further includes a discriminator for carrying out signal discrimination of the input image signal, wherein the signal generator produces an image signal for a luminance reference image on the basis of a discrimination result of the discriminator.

Preferably, the image processing apparatus further includes an adjustor for adjusting the luminance and the contrast of an image based on an image signal produced by the mixer, a luminance identifying image superimposer for superimposing a luminance identifying image in a desired luminance region in an image based on an image signal produced by the mixer, a display position controller for changing the positional relationship between an image based on the input image signal and the luminance reference image by controlling the signal generator, and a storage for storing setting information for generating an image signal of the luminance reference image by the signal generator.

Another aspect of the present invention provides an image processing method including the steps of generating an image signal of a luminance reference image that provides a standard for determining a luminance, and generating an image signal for displaying a combination of a display image based on the input image signal and the luminance reference image by using an input image signal and an image signal of the luminance reference image.

Preferably, the image processing method includes the step of carrying out signal discrimination of the input image signal, wherein an image signal of the luminance reference image is generated on the basis of a discrimination result obtained from the signal discrimination.

Preferably, the signal discrimination of the input image signal involves the determination of an aspect ratio.

Preferably, it is detected whether a region with no image occurs on a display screen by determining the aspect ratio, and an image signal of the luminance reference image is produced so that the luminance reference image is displayed in the region with no image if it is detected that a region with no image will be on the display screen.

Preferably, it is detected whether a region with no image will take place on a display screen by determining the aspect ratio, and if it detects that a region with no image will not take place on the display screen, then it performs image reduction based on the input image signal, thereby forming a region with no image, and an image signal of the luminance reference image is produced so that the luminance reference image is displayed in the formed region with no image.

Preferably, it is detected whether a region with no image will take place on a display screen by determining the aspect ratio, and if it is detected that a region with no image will not take place on the display screen, then the luminance reference image is superimposed on an image based on the input image signal.

Preferably, color discrimination on an image is carried out on the basis of the input image signal in the step for discriminating the input image signal, and an image signal for displaying the luminance reference image with a color based on the result of the color discrimination is produced.

Preferably, a dominant color is identified in the color discrimination, and an image signal for displaying the luminance reference image by using the identified color is produced.

Preferably, an image signal is produced, the image signal having at least one of a first luminance reference image showing a predetermined gray scale, a second luminance reference image showing a gray scale that is different from the first luminance reference image, a third luminance reference image for adjusting high luminance, and a fourth luminance reference image for adjusting low luminance.

Preferably, an image signal is produced for the luminance reference image in which the gray scale difference in the third luminance reference image and the gray scale difference in the fourth luminance reference image are smaller than the gray scale difference in the first luminance reference image and the gray scale difference in the second luminance reference image.

Preferably, the luminance and the contrast of an image based on an image signal is for displaying a display image based on the input image signal combined with the luminance reference image.

Preferably, a luminance identifying image is superimposed in a desired luminance region in an image based on an image signal for displaying the display image based on the input image signal combined with the luminance reference image.

Preferably, the luminance identifying image is superimposed by using a zebra signal.

Preferably, the positional relationship between an image based on the input image signal and the luminance reference image is changed.

Preferably, setting information for generating an image signal of the luminance reference image is stored.

DESCRIPTION OF THE PREFERRED EMBODIMENTS

Figure 1:
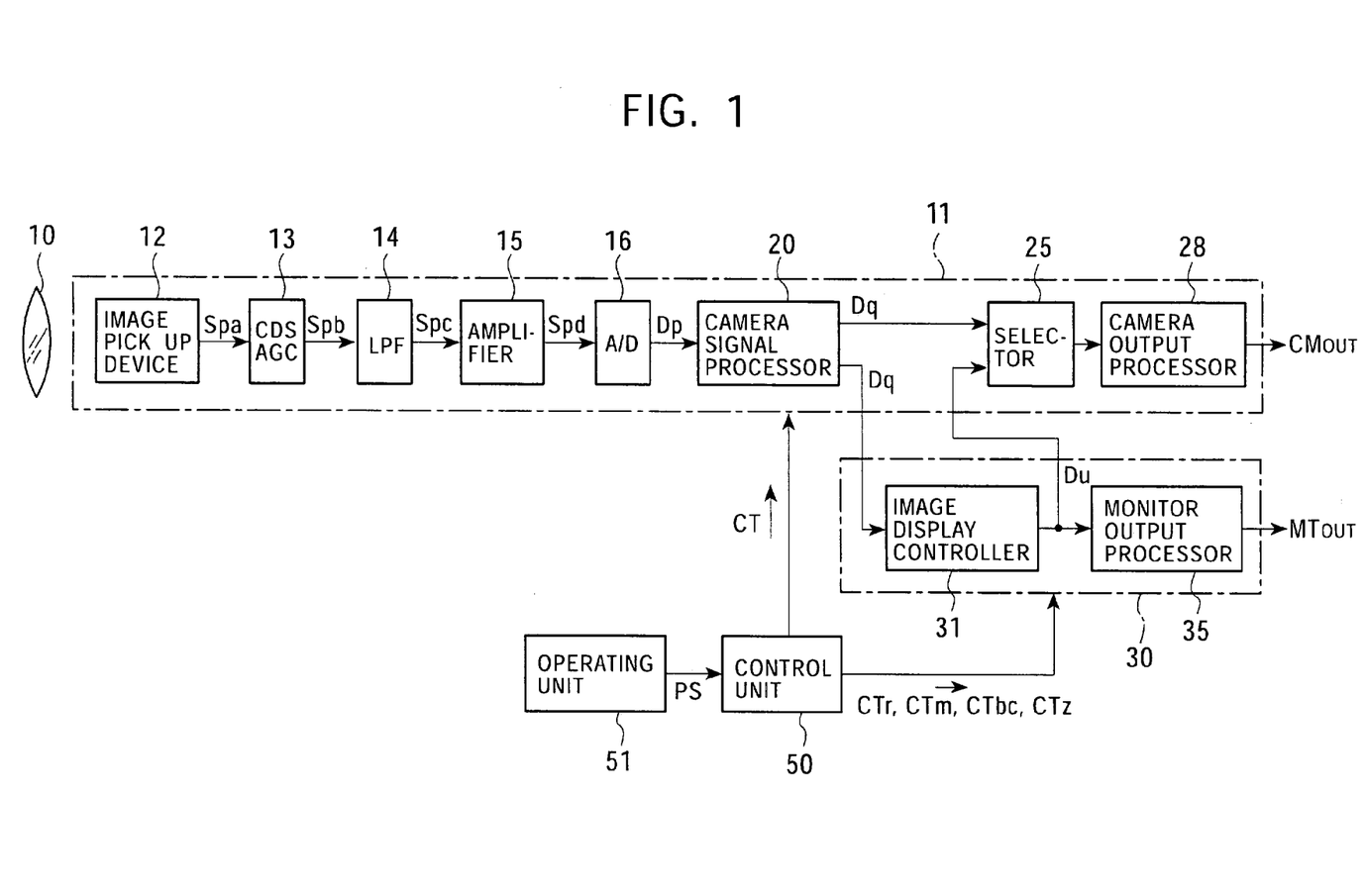
FIG. 1 is a block diagram showing the construction of a video camera in accordance with the present invention.

Referring to the accompanying drawings, an embodiment of the present invention will be explained. FIG. 1 shows the construction of an embodiment of a video camera in accordance with the present invention.

The light coming through an image pickup lens system 10 is incident upon an image pickup device 12, which constitutes a main line system block 11, to form the image of an object on an image pickup surface. The image pickup device 12, which is constructed using a solid image pickup device, such as a CCD, generates a primary-color image pickup signal Spa on the basis of the image of the object by photoelectric conversion, and supplies the generated signal Spa to a correlated double sampling (CDS)/AGC 13.

The CDS/AGC 13 carries out correlated double sampling to remove noise components from the image pickup signal Spa. The signal from which the noise components have been removed is amplified and supplied as an image pickup signal Spb to a low-pass filter 14. The low-pass filter 14 extracts an original signal spectrum component from the image pickup signal Spb supplied from the CDS/AGC 13, and supplies it as an image pickup signal Spc to an amplifier 15. The amplifier 15 amplifies the supplied image pickup signal Spc, and supplies the amplified signal as an image pickup signal Spd to an A/D converter 16. The A/D converter 16 converts the supplied image pickup signal Spd into a digital image pickup signal Dp and supplies it to a camera signal processor 20.

The camera signal processor 20 carries out signal processing on the supplied image pickup signal Dp so as to allow a good target image to be obtained. The signal processing includes, for example, shading correction, masking correction, knee correction, gamma correction, or profile compensation. An image signal Dq is generated from the image pickup signal Dp, and supplied to a selector 25 and an image display controller 31 of a monitor system block 30.

The image display controller 31 generates an image signal Dr of a luminance reference image that provides a standard for determining the luminance of a target image, and the image signal Dr and an image signal Dq supplied from the camera signal processor 20 are used to generates an image signal for displaying a combination of a target image and a luminance reference image. The generated image signal is further subjected to signal processing, such as the adjustment of the luminance or contrast, and a resulting image signal Du is supplied to a monitor output processor 35 and the selector 25 of the main line system block 11 shown in FIG. 1.

Figure 2:
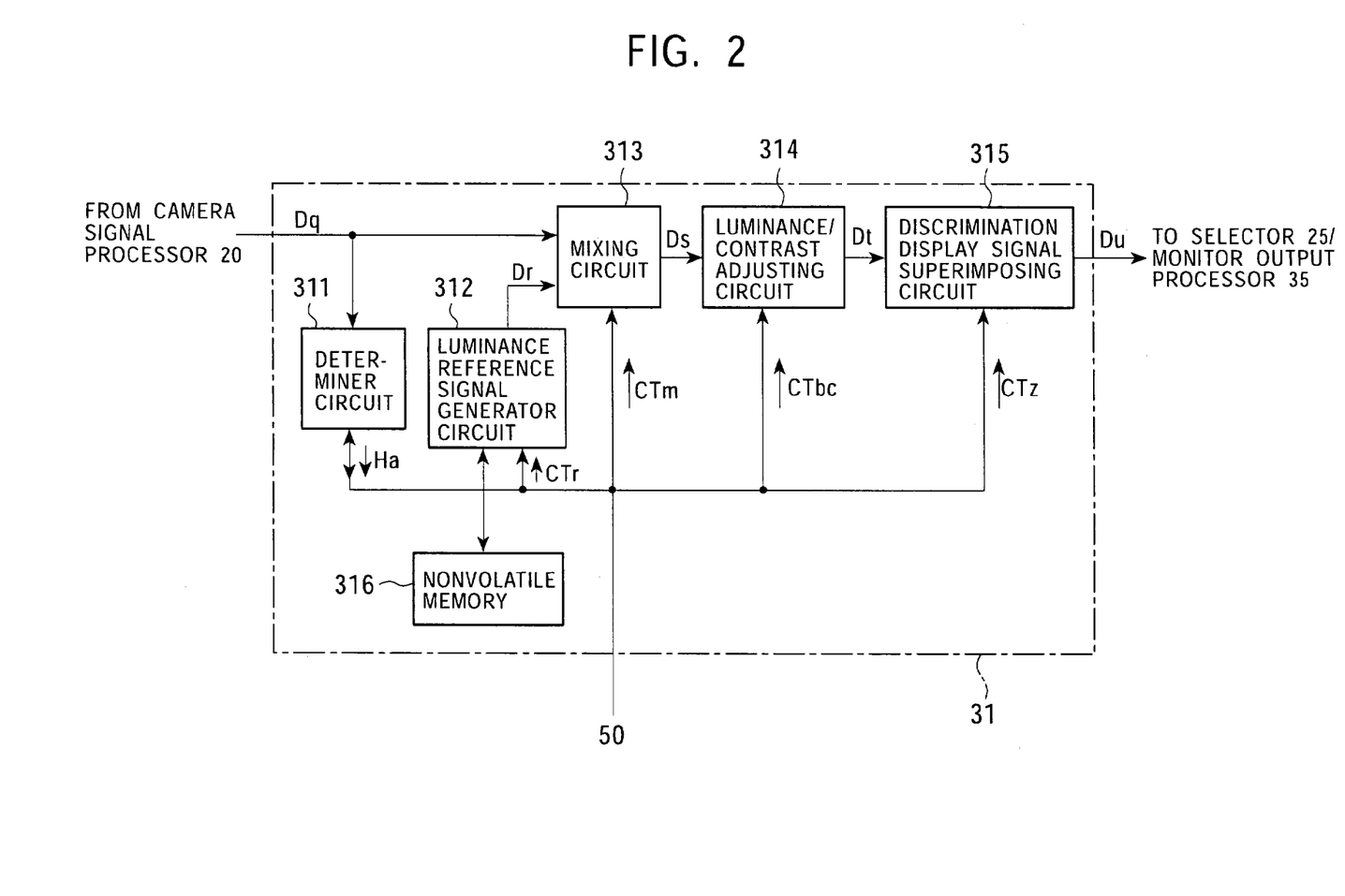
FIG. 2 is a diagram showing the construction of an image display controller.

FIG. 2 shows the construction of the image display controller 31. The image signal Dq supplied from the camera signal processor 20 is input to a determiner circuit 311 and a mixing circuit 313. The determiner circuit 311 carries out signal discrimination of the image signal Dq. The signal discrimination includes the determination of the signal format of the image signal Dq and the color discrimination of a target image based on the image signal Dq. The determiner circuit 311 generates a discrimination signal Ha indicating a discrimination result, and supplies it to a control unit 50, which will be discussed hereinafter.

The image display controller 31 is provided with a luminance reference signal generator circuit 312. The luminance reference signal generator circuit 312 produces an image signal Dr of a luminance reference image that provides the standard for determining the luminance of a target image on the basis of a control signal CTr supplied from the control unit 50 in accordance with the signal format of the image signal Dq and the color that have been determined by the determiner circuit 311. The image signal Dr of the luminance reference image generated by the luminance reference signal generator circuit 312 is supplied to the mixing circuit 313.

The mixing circuit 313 generates an image signal Ds for displaying a combination of a target image and a luminance reference image by using the image signal Dq of the target image and the image signal Dr of a luminance reference image on the basis of a control signal CTm from the control unit 50. The generated image signal Ds is supplied to a luminance/contrast adjusting circuit 314. For instance, a part of the image signal Dq is replaced by the image signal Dr, or the image signal Dr is added to the image signal Dq to produce an image signal Ds. The image signal Ds is supplied to the luminance/contrast adjusting circuit 314.

The luminance/contrast adjusting circuit 314 adjusts the signal level of an image signal Ds supplied from the mixing circuit 313 on the basis of a control signal CTbc supplied from the control unit 50 so as to make it possible to obtain a display image of desired luminance and contrast. The image signal Ds whose signal level has been adjusted by the luminance/contrast adjusting circuit 314 is supplied as an image signal Dt to a discrimination display signal superimposing circuit 315.

The discrimination display signal superimposing circuit 315 compares the signal level of the image signal Dt supplied from the luminance/contrast adjusting circuit 314 with the range setting signal level indicating the desired luminance range set on the basis of a control signal CTz supplied from the control unit 50. If the signal level of the image signal Dt lies within the range indicated by the range setting signal level, then a discrimination display signal that makes it easy to determine that the signal level lies within the desired luminance range is superimposed on the image signal Dt. Such a discrimination display signal may be a zebra signal that uses stripes to indicate that the signal level lies in a desired luminance range. The image signal Dt that has been subjected to the superimposition of the discrimination display signal performed by the discrimination display signal superimposing circuit 315 is supplied as an image signal Du to the monitor output processor 35 and the selector 25 of the main line system block 11 shown in FIG. 1.

Based on the control signal from the control unit 50, the selector 25 selects an image signal Dq supplied from the camera signal processor 20 or an image signal Du supplied from the image display controller 31, and supplies the selected signal to the camera output processor 28.

The camera output processor 28 converts the image signal Dq or the image signal Du supplied from the selector 25 into a signal CMout compatible with the device connected to a video camera, and outputs the signal CMout. For example, when a device compatible with a component signal or a device compatible with a composite signal is connected, the image signal output from the selector 25 is converted into a signal CMout compatible with each device, and the converted signal is output. If image signals are transmitted through a serial digital interface or the like that has been standardized as SMPTE259M, then transmission data conforming to an interface standard is generated using the image signal supplied from the selector 25, and the generated signal is output as the signal CMout.

The monitor output processor 35 converts an image signal Du supplied from the discrimination display signal superimposing circuit 315 of the image display controller 31 into a signal MTout compatible with an image display device, such as an electronic viewfinder, for monitoring a target image, and outputs the signal MTout. For instance, if an image display device uses analog signals, then the image signal Du is converted into an analog signal and output as a signal MTout.

An operating unit 51 is connected to the control unit 50. When the user of a video camera operates the operating unit 51, an operating signal PS associated with the operation performed by the user is supplied from the operating unit 51 to the control unit 50. Based on the operating signal PS, the control unit 50 generates a variety of control signals CT and supplies them to the main line system block 11 of a video camera or a monitor system block 30 so as to operate the video camera in response to the operation performed by the user. The control unit 50 receives discrimination signals Ha from the determiner circuit 311, as previously mentioned, generates control signals CTr, CTm, CTbc, and CTz on the basis of the discrimination signals Ha and the operating signals PS, and supplies the generated signals to the monitor system block 30.

Figure 3:
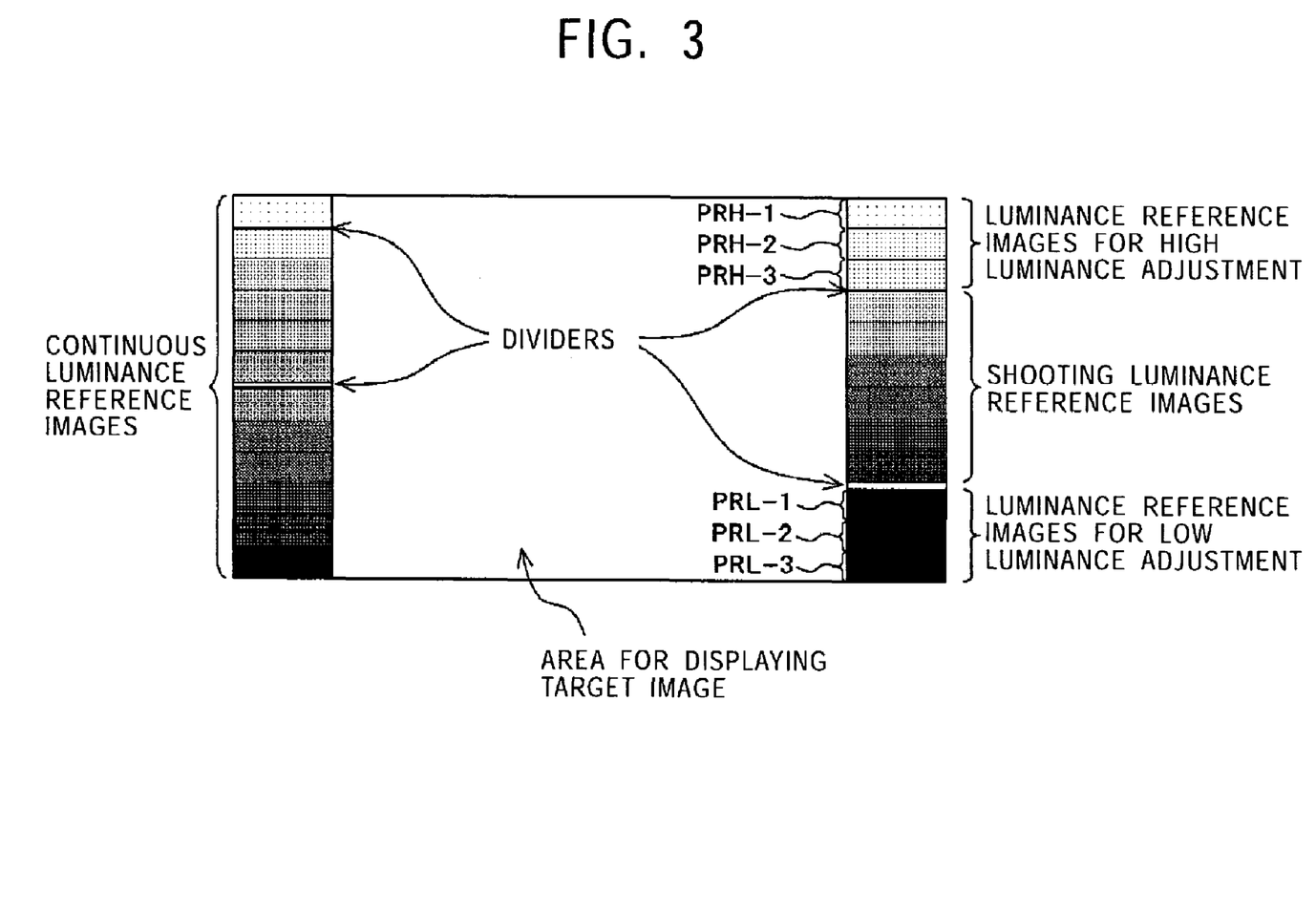
FIG. 3 is a diagram showing a mode of a luminance reference image.

The operation will now be described. FIG. 3 shows a mode of a luminance reference image based on the image signal Dr generated by the luminance reference signal generator circuit. On the left side in the display screen, continuous luminance reference images displaying different luminance levels in steps from, for example, low luminance to high luminance are displayed. FIG. 3 illustrates a case where the luminance levels are indicated in steps of, for example, 10% (10 IRE) from 0% (0 IRE) to 110% (110 IRE). In the continuous luminance reference images, dividers are displayed as approximate indicators of luminance levels to permit easy recognition of a luminance level. For example, the divider showing the boundary between a luminance level "50%" and a luminance level "60%," and the divider showing the boundary between a luminance level "100%" and a luminance level "110%" are provided to make it easy to determine the individual luminance levels of the continuous luminance reference images.

On the right side of the display screen, for example, a plurality of luminance reference images for high luminance adjustment and a plurality of luminance reference images for low luminance adjustment are displayed. In the plurality of luminance reference images for high luminance adjustment, the difference in luminance between adjoining luminance reference images for high luminance adjustment is set to be small. Similarly, in the plurality of luminance reference images for low luminance adjustment, the difference in luminance between adjoining luminance reference images for low luminance adjustment is set to be small. In each video camera, the luminance/contrast adjusting circuit 314 adjusts the signal level of the image signal Ds so as to equalize the positions of the luminance reference images by which luminance differences can be recognized in the plurality of luminance reference images for adjusting high luminance. Similarly, the luminance/contrast adjusting circuit 314 adjusts the signal level of the image signal Ds so as to equalize the positions of the luminance reference images at which luminance differences can be recognized in the plurality of luminance reference images for adjusting low luminance. For instance, the adjustment is made such that the luminance difference between a luminance reference image PRH-1 for adjusting high luminance and a luminance reference image PRH-2 for adjusting high luminance cannot be recognized, while the luminance difference between a luminance reference image PRH-2 for adjusting high luminance and a luminance reference image PRH-3 for adjusting high luminance can be recognized. Similarly, the adjustment is made such that the luminance difference between a luminance reference image PRL-3 for adjusting low luminance and a luminance reference image PRL-2 for adjusting low luminance cannot be recognized, while the luminance difference between a luminance reference image PRL-2 for adjusting low luminance and a luminance reference image PRL-1 for adjusting low luminance can be recognized. Thus, the luminance/contrast adjusting circuit 314 adjusts the signal levels of the image signals Ds in the luminance reference images for adjusting high luminance and the luminance reference images for adjusting low luminance in each video camera such that the luminance reference images that allow differences in luminance to be identified are placed at the same positions. This makes it possible to obtain uniform luminance and contrast characteristics of the image display device, such as an electronic viewfinder, for monitoring target images on the basis of a signal MTout.

An image pickup luminance reference image that indicates a desired gray scale most frequently desired by the user of a video camera is displayed between the luminance reference image PRH for adjusting high luminance and the luminance reference image PRL for adjusting low luminance. For instance, an image pickup luminance reference image that displays a desired luminance range with desired luminance differences in steps is provided to allow the luminance level of a flesh color portion to be adjusted to a proper luminance level. Thus, the image pickup luminance reference images are displayed on the basis of the luminance levels most frequently used by the user of the video camera, thereby permitting easy adjustment of shooting conditions to obtain a desired luminance level of an object at the time of imaging.

If the dividers are provided between the luminance reference images for adjusting high luminance and the image pickup luminance reference images, and between the luminance reference images for adjusting low luminance and the image pickup luminance reference images, then it will be easy to distinguish between the luminance reference images for adjusting high luminance and the luminance reference images for adjusting low luminance and the image pickup luminance reference images.

Obviously, the luminance level range and the number of gray scales of the luminance reference images, or the positions or shapes of the displayed luminance levels and the like shown in FIG. 3 are merely illustrative and not restrictive. The number of gray scales, luminance levels, and the like of the luminance reference images may be set in advance, or the luminance reference images may be changed according to target images. For instance, the average value or standard deviation of all pixels in a target image may be calculated, and the luminance level range, the number of gray scales or the like of the luminance reference image may be changed accordingly. In this case, a luminance reference image of a low luminance level is displayed for a dark target image, or the number of gray scales is decreased, assuming that no display of a luminance reference image of a high luminance level is required. For a target image with a smaller difference in luminance level, a luminance reference image in the luminance level range of a target image is displayed, and a detailed luminance reference image is displayed with smaller luminance level differences among gray scales. Thus, the luminance reference images can be used effectively and efficiently by changing the luminance reference images according to target images.

The descriptions will now be given of the operation for displaying a target image combined with a luminance reference image. The explanation will be based on an assumption that the display screen of an image display device used for monitoring a target image has the aspect ratio is, for example, 16:9.

Figure 4:
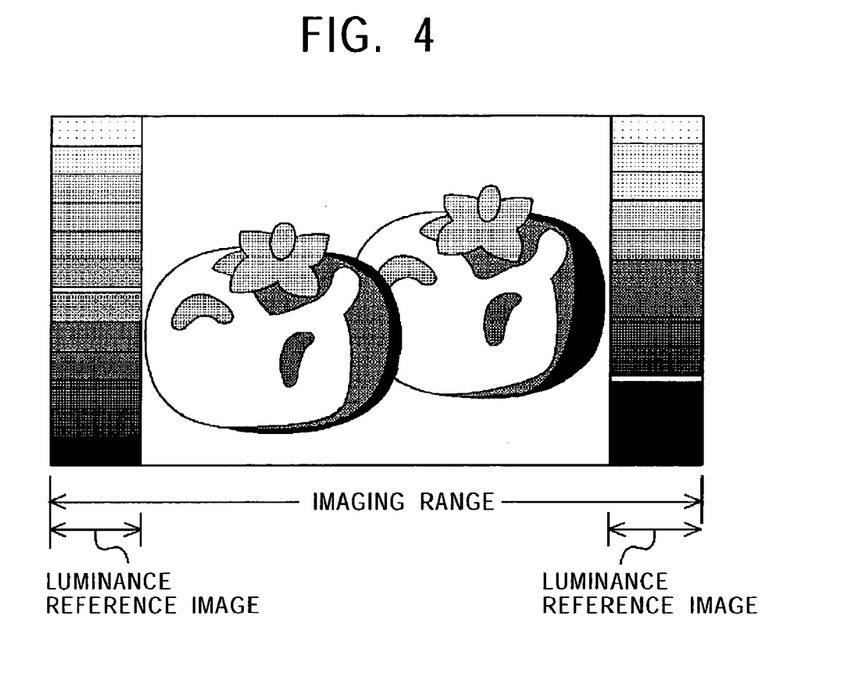
FIG. 4 is a diagram showing a case where a part of a target image has been replaced by a luminance reference image and displayed.

FIG. 4 shows a case where a target image having a part thereof replaced by a luminance reference image is displayed. If the format of an image signal Dq of the target image discriminated by the determiner circuit 311 is determined to have an aspect ratio of 16:9 by the control unit 50, then the control unit 50 generates a control signal CTr on the basis of a discrimination signal Ha and supplies the generated signal to the luminance reference signal generator circuit 312. The control unit 50 also generates a control signal CTm and supplies the generated signal to the mixing circuit 313.

The luminance reference signal generator circuit 312 generates an image signal Dr that has a signal format equivalent to the signal format of the image signal Dq and is for displaying the luminance reference images shown in FIG. 3, and supplies the generated signal to the mixing circuit 313. Based on the control signal CTm, the mixing circuit 313 selects the image signal Dr at the left end portion or right end portion of the display screen, or selects the image signal Dq at the central portion of the display screen.

In this case, the luminance reference images in place of target images are displayed on the right end portion and the left end portion of the display screen, as shown in FIG. 4. By using the image pickup luminance reference images or the continuous luminance reference images, the imaging conditions, such as illumination or the aperture of the image pickup lens system 10, can be easily adjusted to obtain desired brightness of an object. Furthermore, the luminance reference images for adjusting high luminance and the luminance reference images for adjusting low luminance can be used to adjust the luminance or contrast of an image display device. The mixing circuit 313 selects the image signal Dr in place of the image signal Dq to display the luminance reference images. Alternatively, however, the image signal Dq may be overwritten with the image signal Dr at the right end portion or the left end portion of the display screen to display the luminance reference images. The image signal Dr is selected in place of the image signal Dq, or the image signal Dq is overwritten with the image signal Dr to display the luminance reference images, thus simplifying the construction for displaying luminance reference images.

In the example illustrated in FIG. 4, a part of the target image is replaced by the luminance reference images, making it impossible to discriminate what object is included in an imaging view angle. For this reason, a target image is reduced and displayed so as to produce an image-free area when the target image is displayed on the display screen. For instance, a target image is horizontally compressed to provide empty areas on the right and left sides of the target image so as to display the luminance reference images in the empty areas. In this case, the determiner circuit 311 identifies the signal format of the image signal Dq and notifies the control unit 50 of the identified signal format. If the control unit 50 determines, on the basis of the discrimination signal Ha, that the aspect ratio of the target image and the aspect ratio of a display screen substantially match, then it controls the operation of the mixing circuit 313 to switch a signal or overwrite a signal, and also reduce the target image. For example, horizontal pixel thinning is carried out on the image signal Dq to compress the target image in the horizontal direction.

Figure 5:
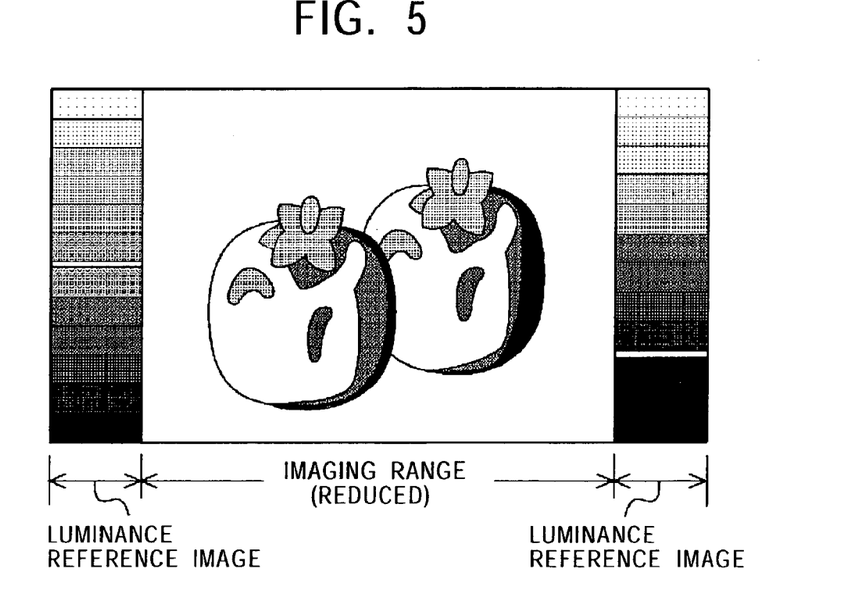
FIG. 5 is a diagram showing a case where an arrangement has been made to allow the entire target image to be displayed.

When the image signal Dq that has been subjected to the reductive processing is selected at the center of the display screen, and the image signal Dr for the luminance reference images is selected in the empty area, the luminance reference images can be displayed in the right end portion and the left end portion of the display screen, and the entire target image can be displayed at the center of the screen, as shown in FIG. 5. This permits easy adjustment of image pickup conditions and of the luminance and contrast of an image display device, and makes it possible to accurately determine the object covered by a shooting view angle.

Figure 6:
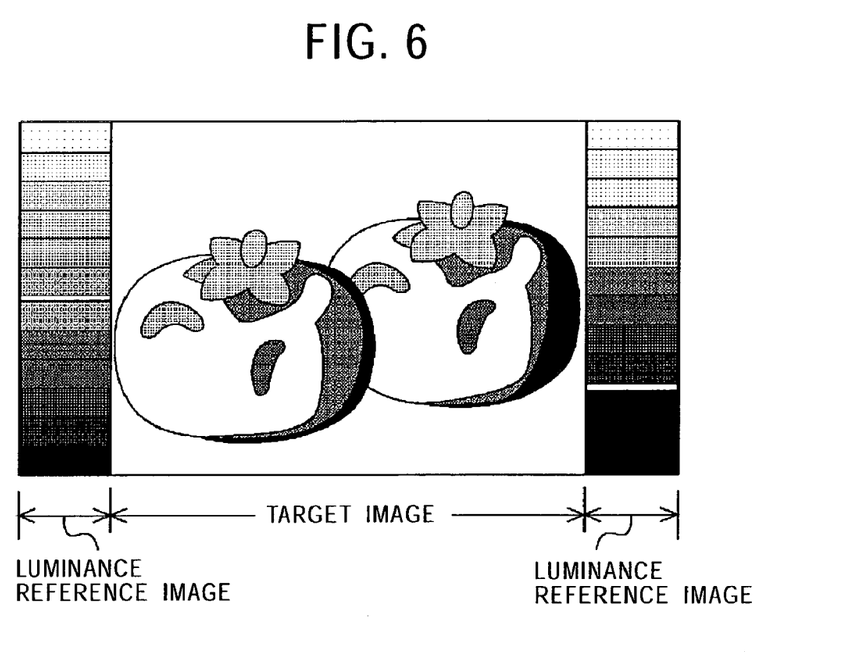
FIG. 6 is a diagram showing a case where luminance reference images are displayed at right and left by using available regions.

If the aspect ratio of a target image and the aspect ratio of the display screen of an image display device do not match, then the luminance reference images are displayed by using the empty area produced when the target image is displayed on the display screen of the image display device. For instance, if the control unit 50 determines that the signal format of the image signal Dq identified by the determiner circuit 311 has an aspect ratio of 4:3, which is vertically longer than the display screen, then the control unit 50 generates a control signal CTr based on a discrimination signal Ha, and supplies the generated signal to the luminance reference signal generator circuit 312. The control unit 50 also generates a control signal CTm and supplies it to the mixing circuit 313. Based on the control signal CTm, the mixing circuit 313 selects the image signal Dr in the left end portion of the display screen. The image signal Dq is delayed by the display of the luminance reference images of the left end portion so as to turn the image signal Dq into the signal for the central portion of the display screen, and the delayed image signal Dq is selected. After completion of the image signal Dq, the image signal Dr is selected. In this case, as shown in FIG. 6, a target image of an aspect ratio of 4:3 can be displayed at the center of the display screen, and the luminance reference images can be displayed by effectively using the empty areas on the right and left sides of the target image.

Figure 7:
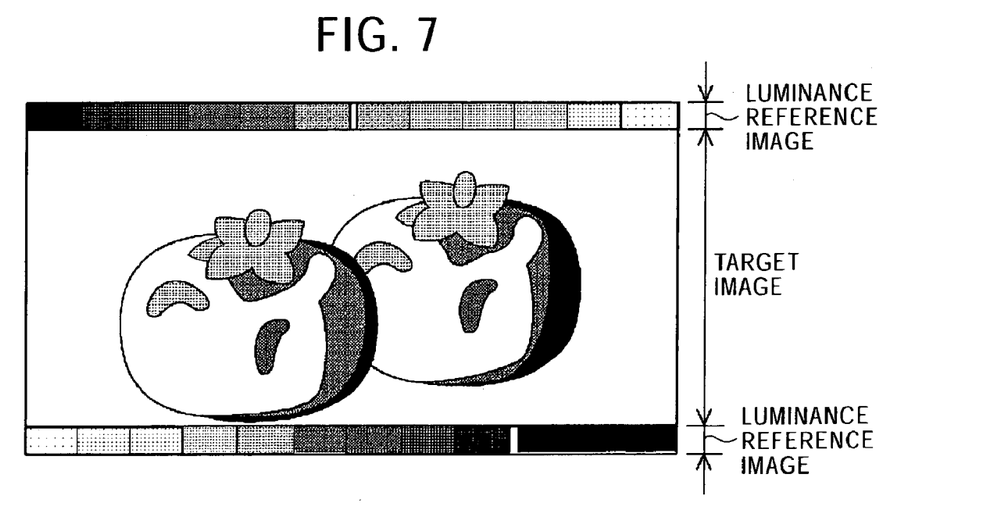
FIG. 7 is a diagram showing a case where luminance reference images are displayed at top and bottom by using available regions.

If the control unit 50 determines that the signal format of the image signal Dq discriminated by the determiner circuit 311 is horizontally longer than the display screen, as in the case of a movie vista size 1.85:1 or a cinemascope size 2.39:1, then the control unit 50 generates a control signal CTr based on the discrimination signal Ha, and supplies the generated signal to the luminance reference signal generating circuit 312 to produce the image signal Dr for displaying the luminance reference images in the horizontal direction. Based on a control signal CTm, the mixing circuit 313 selects the image signal Dr for a predetermined number of vertical periods on the upper end side of the display screen. The image signal Dq is delayed by the predetermined number of vertical periods on the upper end side, and the delayed image signal Dq is selected during a vertical scanning period at the central portion of the screen. Thereafter, the image signal Dr is selected for a predetermined number of vertical periods at the lower end side of the display screen. In this case, as shown in FIG. 7, a horizontally long target image can be displayed at the center of the display screen, and the luminance reference images can be also displayed at the upper and lower sides of the target image.

Figure 8:
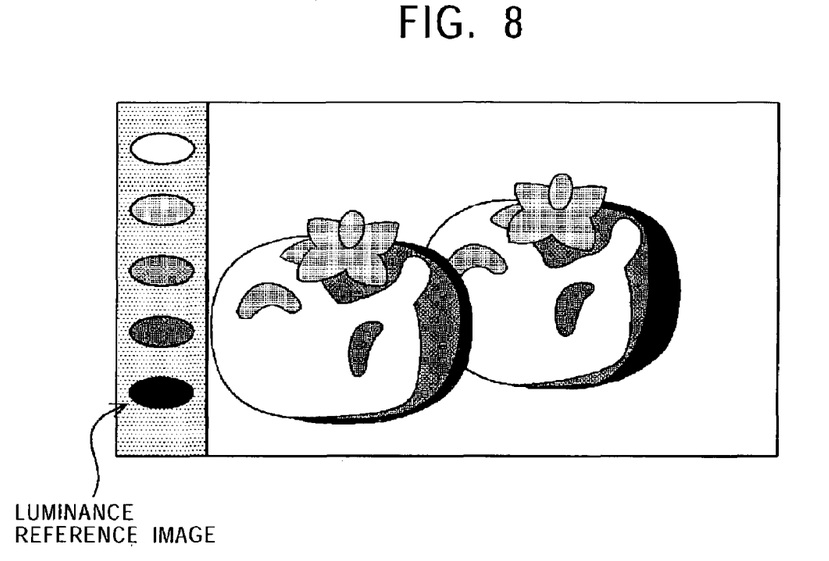
FIG. 8 is a diagram showing a case where the luminance reference images are elliptical.

Each of the luminance reference images displays a luminance level in a rectangular shape, and difference luminance levels are displayed in a plurality of rectangular shapes to constitute the luminance reference images, as shown in FIG. 3. The display of a luminance level is not limited to the rectangular shape; it may use a different shape. For instance, a plurality of elliptical shapes may be used to display different luminance levels, as shown in FIG. 8.

When a desired object on a pickup image is compared with the luminance reference images displayed on the screen to determine the luminance of the object, if the object whose luminance is to be determined is distanced from the luminance reference images, then it is difficult to determine the luminance of the object easily and accurately. For this reason, when the signal level of an image signal Dt lies within a predetermined luminance range, the discrimination display signal superimposing circuit 315 shown in FIG. 2 superimposes the discrimination display signal on the image signal Dt to produce an image signal Du. The image signal Du is supplied to the monitor output processor 35 and the selector 25 of the main line system block 11.

Figure 9:
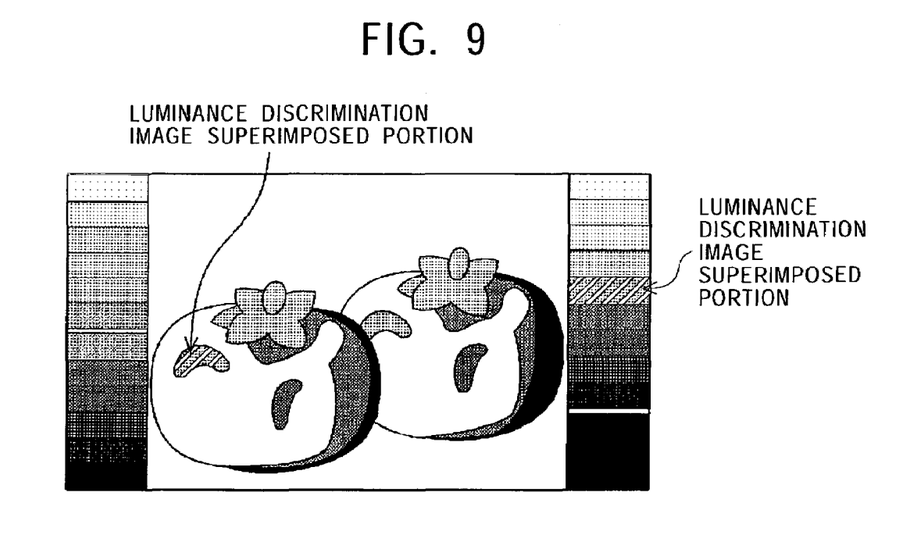
FIG. 9 is a diagram showing a case where a luminance identifying image has been superimposed.

Thus, when the operating unit 51 is operated to set a luminance range in which discrimination display is performed, the discrimination display, such as stripe display, is superimposed on a luminance reference image in the set luminance range, as shown in FIG. 9. On the imaging screen also, the discrimination display is superimposed on the object image in the set luminance range, so that the luminance of the object can be accurately and easily determined. When the stripe display is used for the discrimination, a conventional zebra signal generator circuit can be used, permitting discrimination display to be easily superimposed on an object image.

Figure 10:
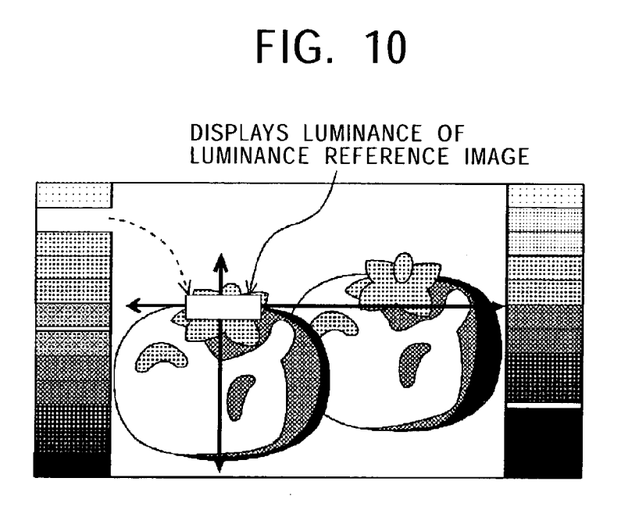
FIG. 10 is a diagram showing a case where the luminance reference images are set movable on a target image.

If the luminance reference images are distant from an object whose luminance is to be discriminated, the position of the luminance reference images or the position of a target image may be made changeable so as to permit easy and accurate discrimination of the luminance of the object. When the position of the image is changed, the amount of signal processing involved in the movement of an image can be reduced by moving the luminance reference images having a smaller image display area than that of the target image. To move the luminance reference images, the entire luminance display block of a plurality of luminance levels may be moved; however, selecting a desired luminance display and making only the selected luminance display movable, as shown in FIG. 10, then the amount of signal processing for moving the image can be further reduced, allowing efficient movement of the image to be accomplished. Alternatively, only an luminance reference image of a desired luminance may be displayed and movable. When the images are made movable, the luminance reference image of the desired luminance and the desired position of a target image can be brought close to each other. This allows the user to easily and accurately determine the luminance, as compared with a case where the luminance reference images and the object whose luminance is to be discriminated are far apart.

Figure 11:
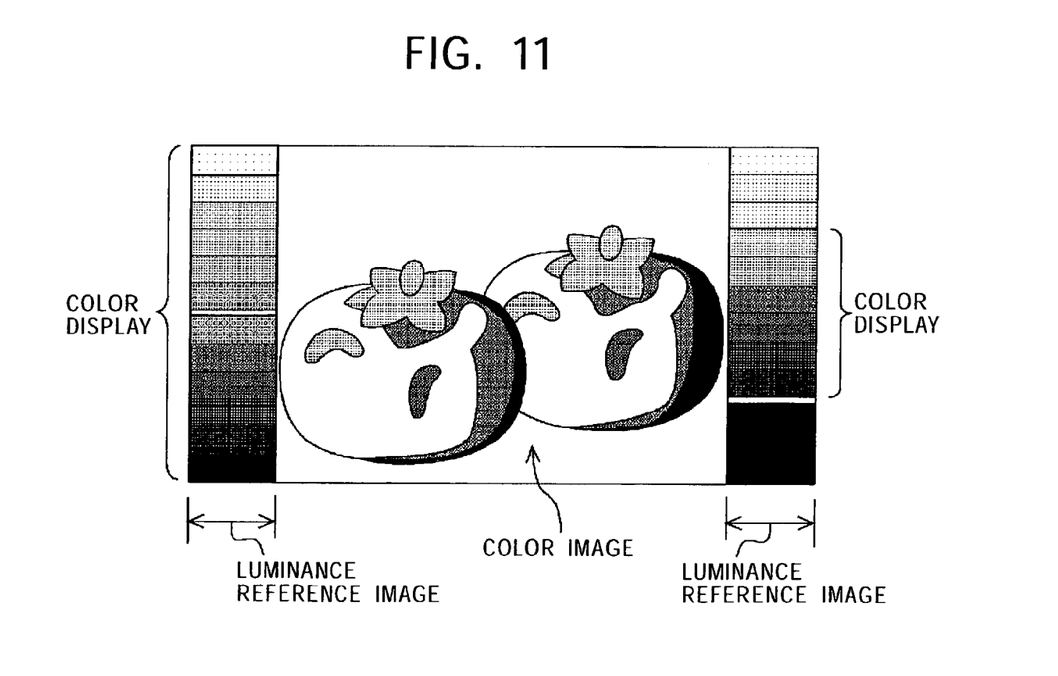
FIG. 11 is a diagram showing a case where a target image is a color image.

If the target image displayed on the image display device is a color image, then the determination of luminance is more difficult than the case of a monochromic image. More specifically, if the chroma or hue of an object whose luminance is to be determined is considerably different from that of the luminance reference image, then it will be difficult to decide whether the brightness is the same when the luminance reference image and the object are compared. For this reason, if the target image displayed on the image display device is a color image, then the luminance reference images in the colors based on the target images are displayed, as illustrated in FIG. 11. In this case, to select the luminance reference image of the appropriate color, for example, the dominant color contained in the target image is used. To be more specific, in the determiner circuit 311, the colors of all pixels or the color of the pixel at a representative point is determined as the most dominant color, and the control unit 50 is notified of the dominant color. The control unit 50 controls the operation of the luminance reference signal generator circuit 312 to generate the image signal Dr for the continuous luminance reference image or an imaging luminance reference image of the color determined by the determiner circuit 311.

The color of the luminance reference image may be determined on the basis of, for example, the color given highest priority by the user when adjusting luminance. In this case, the operating unit 51 is operated to specify the color, and the control unit 50 controls the operation of the luminance reference signal generator circuit 312 to generate the image signal Dr for the continuous luminance reference image or the imaging luminance reference image of the specified color. Furthermore, the user operates the operating unit 51 to specify the portion whose luminance is to be determined in the target image displayed on the image display device. The control unit 50 notifies the determiner circuit 311 of the position specified by the user, and the determiner circuit 311 discriminates the color at the specified position and notifies the control unit 50 of the discriminated color. Thereafter, the control unit 50 controls the operation of the luminance reference signal generator circuit 312 to generate the image signal Dr for the continuous luminance reference image or an imaging luminance reference image of the color discriminated by the determiner circuit 311.

It is also possible to display the luminance reference images by using both the dominant color in a target image and the color to which the user gives the highest priority in adjusting the luminance. For example, the dominant color in the target image is used to display a continuous luminance reference image, and the color to which the user gives the highest priority in adjusting the luminance reference image is used to display a imaging luminance reference image. This makes it possible to accurately determine the luminance of a background image or the like by using the continuous luminance reference image, and to accurately determine the luminance or the like of the face of a person by using the imaging luminance reference image.

In the embodiment described above, the determiner circuit 311 carries out various types of determination on the basis of the image signals Dq, and the luminance reference images are automatically displayed. Obviously, however, it is also possible to manually control the display of the luminance reference images by controlling the operating unit 51.

In determining the luminance of a target image, there are some cases where a luminance reference image emphasizing a bright portion or a luminance reference image emphasizing a dark portion is required, depending on the object to be imaged or the type of a target image to be obtained. Furthermore, desired luminance reference images may differ from one user to another. In such a case, if the number of gray scales of the luminance reference images or the luminance level or the like of each gray scale is set each time, then a complicated operation is required, preventing quick imaging from being accomplished. To avoid this inconvenience, the information for setting the luminance reference images for setting the number of gray scales, the luminance levels, and display modes is stored beforehand in a nonvolatile memory 316 shown in FIG. 2. Storing the information for setting luminance reference images in the nonvolatile memory 316 allows a desired luminance reference image to be promptly displayed simply by reading desired information for setting. Furthermore, by making the nonvolatile memory 316 detachable, desired luminance reference images may be displayed merely by attaching the nonvolatile memory 316 to another video camera. This obviates the need for setting of the number of gray scales or the luminance level or the like of each gray scale of the luminance reference images each time the video camera used is changed, permitting quick start of imaging.

In the above embodiment, the descriptions have been given of the video camera having a main line system block for obtaining the image signals of target images and the monitor system block for displaying target images. Alternatively, however, the main line system block and the monitor system block may be separated, so that the main line system block is provided on the video camera, and the monitor system block is provided on the image display device. In this case, the image display device is provided with the units equivalent to the control unit 50 and the operating unit 51 so as to control the operation or the like of the image display controller 31, as described above. Thus, if the image display device is provided with the monitor system block, then even when a video camera without the function for displaying the luminance reference images is used, luminance can be easily and accurately determined simply by connecting the image display device, permitting improved performance.

As described above, according to the embodiment, the luminance reference images that provide the references for imaging can be displayed, and the luminance reference images can be displayed in combination with a target image. This arrangement makes it possible to easily and accurately adjust the luminance and contrast of an image display device.

Moreover, the brightness of an object can be determined simply by comparing a target image with the luminance reference images, so that an image of a desired signal level can be easily obtained without using an illuminometer or a waveform monitor. In addition, the luminance reference images display a variety of luminance levels, so that the brightness at a plurality of different positions on a target image can be simultaneously recognized.

What is claimed is:

1. An image processing apparatus comprising:
   a signal generator for generating an image signal of a luminance reference image that provides a standard for determining a luminance;
   a mixer that uses an input image signal and the image signal of the luminance reference image to generate an image signal for displaying a combination of a display image based on the input image signal and the luminance reference image;
   a discriminator for carrying out signal discrimination of the input image signal having means for determining an aspect ratio of the input image signal, and means for detecting whether a region with no image occurs on a display screen based on the determined aspect ratio;
   wherein the signal generator produces the image signal of the luminance reference image based on a discrimination result supplied by the discriminator, and
   wherein if the discriminator detects that a region with no image occurs on the display screen, the signal generator produces the image signal of the luminance reference image so that the luminance reference image is displayed in the region with no image.

2. The image processing apparatus according to claim 1, wherein the discriminator discriminates the color of an image based on the input image signal, and
   wherein the signal generator produces an image signal for displaying the luminance reference image with a color based on the result of a color discrimination performed by the discriminator.

3. The image processing apparatus according to claim 2, wherein the discriminator identifies a dominant color, and
   wherein the signal generator produces an image signal for displaying the luminance reference image by using the dominant color identified by the discriminator.

4. The image processing apparatus according to claim 1, wherein the signal generator produces an image signal having at least one of a first luminance reference image showing a predetermined gray scale, a second luminance reference image showing a gray scale that is different from the first luminance reference image, a third luminance reference image for adjusting high luminance, and a fourth luminance reference image for adjusting low luminance, as the luminance reference image.

5. The image processing apparatus according to claim 1, further comprising:
an adjustor for adjusting the luminance and the contrast of an image based on an image signal produced by the mixer.

6. The image processing apparatus according to claim 1, further comprising:
a luminance identifying image superimposer for superimposing a luminance identifying image in a desired luminance region in an image based on an image signal produced by the mixer.

7. The image processing apparatus according to claim 6, wherein the luminance identifying image superimposer superimposes the luminance identifying image by using a zebra signal.

8. The image processing apparatus according to claim 1, further comprising:
a display position controller for changing positional relationship between an image based on the input image signal and the luminance reference image by controlling the signal generator.

9. The image processing apparatus according to claim 1, further comprising:
a storage for storing setting information for generating an image signal for the luminance reference image by the signal generator.

10. The image processing apparatus according to claim 1, further comprising:
a target image signal generator for producing a target image signal, which provides the input image signal, by shooting an object.

11. An image processing apparatus comprising:
a signal generator for generating an image signal of a luminance reference image that provides a standard for determining a luminance;
a mixer that uses an input image signal and the image signal of the luminance reference image to generate an image signal for displaying a combination of a display image based on the input image signal and the luminance reference image;
a discriminator for carrying out signal discrimination of the input image signal having means for determining an aspect ratio of the input image signal, and means for detecting whether a region with no image occurs on a display screen based on the determined aspect ratio;
wherein the signal generator produces the image signal of the luminance reference image based on a discrimination result supplied by the discriminator,
wherein if the discriminator detects that a region with no image will not take place on the display screen, the discriminator controls the mixer to perform image reduction based on the input image signal, thereby forming a region with no image, and the signal generator produces the image signal of the luminance reference image so that the luminance reference image is displayed in the region with no image.

12. An image processing apparatus comprising:
a signal generator for generating an image signal of a luminance reference image that provides a standard for determining a luminance;
a mixer that uses an input image signal and the image signal of the luminance reference image to generate an image signal for displaying a combination of a display image based on the input image signal and the luminance reference image;
a discriminator for carrying out signal discrimination of the input image signal having means for determining an aspect ratio of the input image signal, and means for detecting whether a region with no image occurs on a display screen based on the determined aspect ratio;
wherein the signal generator produces the image signal of the luminance reference image based on a discrimination result supplied by the discriminator,
wherein if the discriminator detects that a region with no image will not take place on the display screen, the discriminator controls the mixer to generate an image signal produced by superimposing the luminance reference image on an image based on the input image signal.

13. An image processing method comprising the steps of:
generating an image signal of a luminance reference image that provides a standard for determining a luminance; and
generating an image signal for displaying a combination of a display image based on an input image signal and the luminance reference image by using the input image signal and the image signal of the luminance reference image;
performing signal discrimination on the input image signal by determining an aspect ratio of the input image signal, and detecting if a region with no image occurs on a display screen based on the determined aspect ratio,
wherein the image signal of the luminance reference image is produced based on a discrimination result obtained in signal discrimination step, and
wherein if it is detected that a region with no image occurs on the display screen, the image signal of the luminance reference image is produced so that the luminance reference image is displayed in the region with no image.

14. The image processing method according to claim 13, wherein an image signal is produced, the image signal having at least one of a first luminance reference image showing a predetermined gray scale, a second luminance reference image showing a predetermined gray scale that is different from the first luminance reference image, a third luminance reference image for adjusting high luminance, and a fourth luminance reference image for adjusting low luminance, as the luminance reference image.

15. The image processing method according to claim 13, wherein the luminance and the contrast of an image based on an image signal is for displaying a display image based on the input image signal combined with the luminance reference image.

16. The image processing method according to claim 13, wherein a luminance identifying image is superimposed in a desired luminance region in an image based on an image signal for displaying the display image based on the input image signal combined with the luminance reference image.

17. The image processing method according to claim 16, wherein the luminance identifying image is superimposed by using a zebra signal.

18. The image processing method according to claim 13, wherein positional relationship between an image based on the input image signal and the luminance reference image is changed.

19. The image processing method according to claim 13, wherein setting information for generating an image signal of the luminance reference image is stored.

20. An image processing method comprising the steps of:

generating an image signal of a luminance reference image that provides a standard for determining a luminance; and generating an image signal for displaying a combination of a display image based on an input image signal and the luminance reference image by using the input image signal and the image signal of the luminance reference image;

performing signal discrimination on the input image signal by determining an aspect ratio of the input image signal, and detecting if a region with no image occurs on a display screen based on the determined aspect ratio, wherein the image signal of the luminance reference image is produced based on a discrimination result obtained in signal discrimination step, and wherein if it is detected that a region with no image will not take place on the display screen, performing image reduction based on the input image signal, thereby forming a region with no image, and producing the image signal of the luminance reference image so that the luminance reference image is displayed in the formed region with no image.

21. An image processing method comprising the steps of:

generating an image signal of a luminance reference image that provides a standard for determining a luminance; and generating an image signal for displaying a combination of a display image based on an input image signal and the luminance reference image by using the input image signal and the image signal of the luminance reference image;

performing signal discrimination on the input image signal by determining an aspect ratio of the input image signal, and detecting if a region with no image occurs on a display screen based on the determined aspect ratio, wherein the image signal of the luminance reference image is produced based on a discrimination result obtained in signal discrimination step, wherein if it is detected that a region with no image will not take place on the display screen, the luminance reference image is superimposed on an image based on the input image signal.

* * * * *